United States Patent [19]

Bennett et al.

[11] Patent Number: 5,916,039
[45] Date of Patent: *Jun. 29, 1999

[54] GOLF CLUB FABRICATION PROCESS AND ARTICLE

[75] Inventors: Richard A. Bennett, Smithtown; Robert L. Benoit, Oakdale; Bernard I. Rachowitz; Glenn L. Spacht, both of Lloyd Neck, all of N.Y.

[73] Assignee: NBG Technologies, Inc., Hauppauge, N.Y.

[ * ] Notice: This patent is subject to a terminal disclaimer.

[21] Appl. No.: 08/889,673

[22] Filed: Jul. 8, 1997

Related U.S. Application Data

[63] Continuation-in-part of application No. 08/831,586, Apr. 9, 1997, Pat. No. 5,743,810.

[51] Int. Cl.$^6$ .............. A63B 53/02; A63B 53/04
[52] U.S. Cl. ........................... 473/305; 473/316
[58] Field of Search .................. 473/305, 306, 473/307, 308, 309, 310, 311, 312, 313, 314, 315, 324, 409

[56] References Cited

U.S. PATENT DOCUMENTS

| | | | |
|---|---|---|---|
| 1,889,743 | 12/1932 | Buhrke | 473/312 |
| 2,462,754 | 2/1949 | Lagerblade | 473/310 |
| 3,355,226 | 11/1967 | Portz | 473/305 |
| 4,523,872 | 6/1985 | Arena et al. | |
| 5,275,408 | 1/1994 | Desbiolles | 473/312 |
| 5,467,989 | 11/1995 | Good | 473/305 |
| 5,743,810 | 4/1998 | Bennett | 473/305 |

*Primary Examiner*—Sebastiano Passanitl
*Attorney, Agent, or Firm*—Salzman & Levy

[57] ABSTRACT

A new method of fabricating the joint between a golf club head and the golf club shaft, and the article fabricated therefrom, is described herein. The golf club head in which the shaft is inserted has a bore hole having a recessed contoured aperture. The hollow, metal, or electrically conductive golf club shaft is placed into the bore hole of the club head, and an electric coil is placed inside the shaft. The electric coil is electrically pulsed, causing the shaft to expand outwardly to fit the contour of the aperture. The electro-formed, mechanically-bonded shaft is now permanently and integrally anchored to the golf club head. The club head aperture is additionally fitted with a plurality of vertically-disposed grooves along the vertical shaft axis. These vertical grooves capture the shaft as it expands outwardly to the internal surface during electromagnetic forming. The electromagnetically-formed shaft expands into these grooves and is prevented from rotationally or angularly slipping about the club head. In another embodiment, a non-conductive shaft can be used. The non-conductive shaft contains a conductive sleeve that is electrically formed thereon, and is bonded to the club head by a second electro-forming process.

14 Claims, 6 Drawing Sheets

Sect A-A

Sect B-B

SECT C-C

Shaft After Forming
Sect A-A

GOLF CLUB FABRICATION PROCESS AND ARTICLE

This is a continuation-in-part of application Ser. No. 831,586 filed on Apr. 9, 1997 now U.S. Pat. No. 5,743,810.

FIELD OF THE INVENTION

The present invention relates to methods of fabricating golf clubs and, more particularly, to a new process of internally expanding a shaft disposed within an inner bore of a golf club head in order to form an inseparable bond therebetween, and the article fabricated from this process.

BACKGROUND OF THE INVENTION

The attachment of a golf club head to its respective shaft is usually accomplished by the process of adhesive bonding. There are many instances in which the adhesive bond will fail. Adhesives in general tend to weaken with time and with repeated stressing. Constant impact and swing forces tend to repeatedly stress and weaken the shaft/head bond.

Failure of the bond, therefore, becomes inevitable. The club head tends to separate from the shaft at the worst possible moment. That is, failure usually occurs during a swing under maximum separation forces. At the moment of separation, the club head will fly off the shaft, becoming an unguided missile. Therefore, the method of adhesively bonding a club head to its respective shaft creates a potential hazard. Often, reinforcing threads are wound about the shaft at the adhesive juncture. These reinforcing threads also tend to wear and fray with time. Such reinforcement provides little benefit in providing a sound union between the parts.

In copending U.S. patent application Ser. No. 08/831,586, filed on Apr. 9, 1997 and assigned to a common assignee, a process is described for electromagnetically forming a golf shaft over a club head post. The general process of electromagnetically forming is well known, and is illustrated in U.S. Pat. No. 4,523,872 issued to Arena et al, on Jun. 18, 1985, for TORSION RESISTANT GROOVED JOINT. The club head post is contoured so that when the shaft is electromagnetically shrunk upon the surface of the contoured post, an integrally inseparable union is formed therebetween in the vertical direction.

This process provides a strong and permanent bond between the club head of a golf club and its respective shaft. In fact, the actual bonded juncture between the club head and the shaft is actually stronger than the parts themselves.

Some manufacturers prefer that the golf club head be attached to the shaft without the appearance of a connecting process or a joining seam. The seamless process provides an internal bore that runs through the club head completely.

The shaft is inserted into the bore and bonded to the club head by adhesive. Although this type of process may produce a golf club that is aesthetically more pleasing, it nonetheless has the same drawbacks as the other adhesively-bonded shaft and club methods.

The present invention seeks to modify the aforementioned electromagnetic forming process to provide an aesthetic looking, seamlessly-joined golf club.

The method of the current invention includes inserting a hollow, electrically-conductive shaft into a bore hole of a golf club head. Thereafter, a coil of wire is inserted into the hollow shaft and a large electrical current is passed through the coil. The current induces electromagnetic forces to reshape the shaft, so that it expands outwardly into the bore hole of the golf club. The bore hole is fabricated with both longitudinal and circumferential grooves and the shaft fills the contours of these apertures. In so doing, the shaft internally bonds to the club head and is locked in place against both rotational and axial forces. In other words, the shaft is restrained from loosening from the club head due to swing-generated centrifugal forces and impact-generated angular or rotational slippage of the shaft about the vertical axis of the club head post.

In another embodiment of this invention, two counter-sunk depressions are provided in the upper and lower surfaces of the club head. The shaft is outwardly expanded at both counter-sunk surfaces, so that the shaft cannot be withdrawn from the club head in either an upward or downward axial direction along the shaft.

SUMMARY OF THE INVENTION

In accordance with the present invention, there is provided a new method of fabricating the joint between a golf club head and the golf club shaft. Also provided is the article fabricated therefrom. The golf club head in which the shaft is inserted comprises a bore hole having a recessed, contoured aperture. The hollow, metal, or electrically-conductive golf club shaft is placed into the bore hole of the club head and an electric coil is placed inside the shaft. The electric coil is electrically pulsed, causing the shaft to expand outwardly to fit the contour of the aperture. The electro-formed, mechanically-bonded shaft is now permanently and integrally anchored to the golf club head. The club head aperture is additionally fitted with a plurality of vertically-disposed grooves along the vertical shaft axis. These vertical grooves capture the shaft as it expands outwardly to the internal surface during electromagnetic forming. The electromagnetically-formed shaft expands into these grooves and is prevented from rotationally or angularly slipping about the club head.

In another embodiment of this invention, two counter-sunk depressions are provided upon the upper and lower surfaces of the club head. The shaft is expanded outwardly at both counter-sunk surfaces, so that the shaft cannot be withdrawn from the club head in either an upward or downward axial direction along the shaft.

In still another embodiment of the invention, a shaft comprising non-conductive material, such as carbon fiber composite material, may be electromagnetically adhered to a golf club head. This process provides a conductive sleeve that is assembled to the non-conductive shaft in the area of the shaft that enters the club head bore hole. The electric coil is then inserted into the hollow shaft as before and then energized to form the bond.

It is an object of this invention to provide an improved method of attaching a golf club head to its shaft.

It is another object of the invention to provide an integral, mechanically-bonded shaft and golf club head, utilizing an internal, electromagnetic forming process.

It is a further object of this invention to provide a mechanical bond between a golf shaft and golf club head, wherein the joining of the shaft to the golf club head is both vertically and angularly secure.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like elements and components will bear the same designation and numbering throughout the figures.

DESCRIPTION OF THE PREFERRED EMBODIMENT

Generally speaking, the invention features a method of attaching a golf club head to its shaft. The method mechanically bonds the club head to the shaft by means of an electromagnetic forming process. A hollow, metal shaft is deformed and expanded outwardly into an internally-contoured recess or aperture disposed within the club head. The bond provides an integral and permanent joint between the parts. In another embodiment, the hollow shaft expands into two counter-sunk depressions disposed upon the upper and lower surfaces of the club head.

Figure 1:
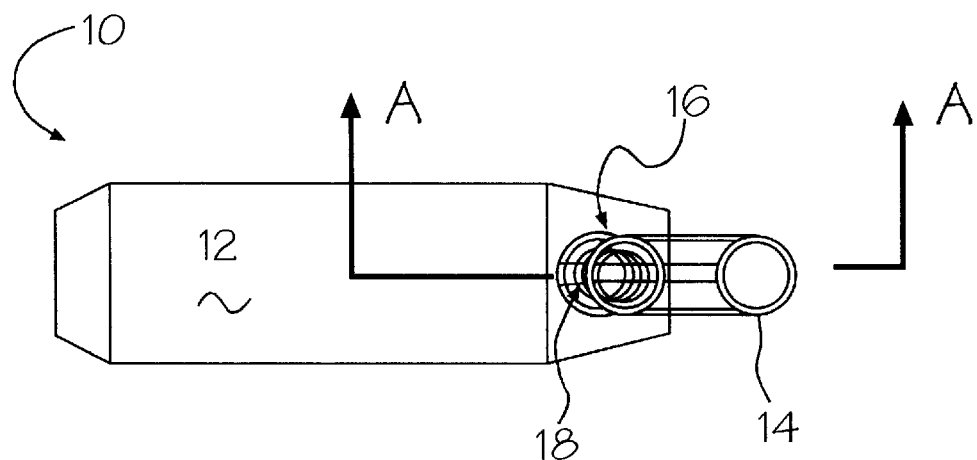
FIG. 1 depicts a top view of a golf club having a club head that receives a hollow shaft, and an internally-placed electrical coil disposed therein.

Now referring to FIG. 1, an unassembled view of a golf club 10 is illustrated. The golf club 10 comprises a club head 12 and a corresponding hollow, electrically-conductive (metal) shaft 14 that is inserted into a bore hole 16 that has been machined into the club head 12. An electric coil 18 is inserted into the interior of the hollow shaft 14, as illustrated in better detail with reference to FIG. 3. The metallic shaft 14 is mechanically bonded to the club head 12 by means of an electromagnetic forming process, which is similar to that described in the aforementioned U.S. Pat. No. 4,523,872, and copending application Ser. No. 08/831,586. The electromagnetic forming process comprises placing an electrical coil adjacent the parts to be joined, and then pulsing the coil with a high voltage. A magnetic field is produced in the metal shaft, causing it to deform and join the parts together.

Figure 2:
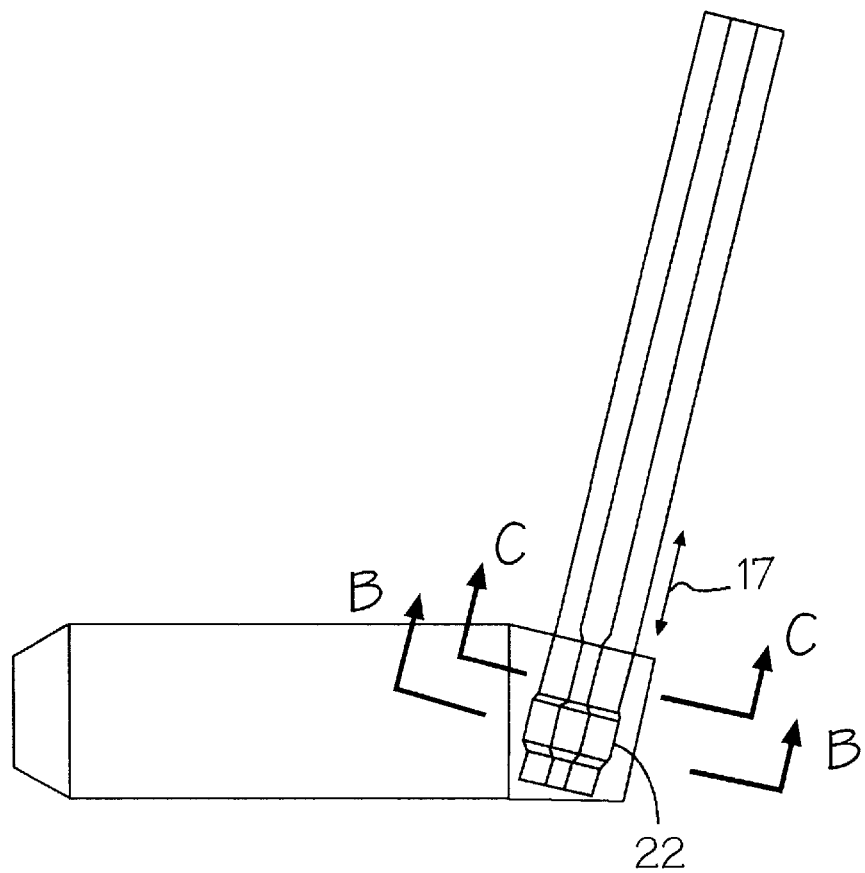
FIG. 2 shows a front view of the golf club depicted in FIG. 1, with a section thereof shown cut-away to reveal the expansion of the electromagnetically formed shaft that has expanded into an aperture of the bore hole.
Figure 3:
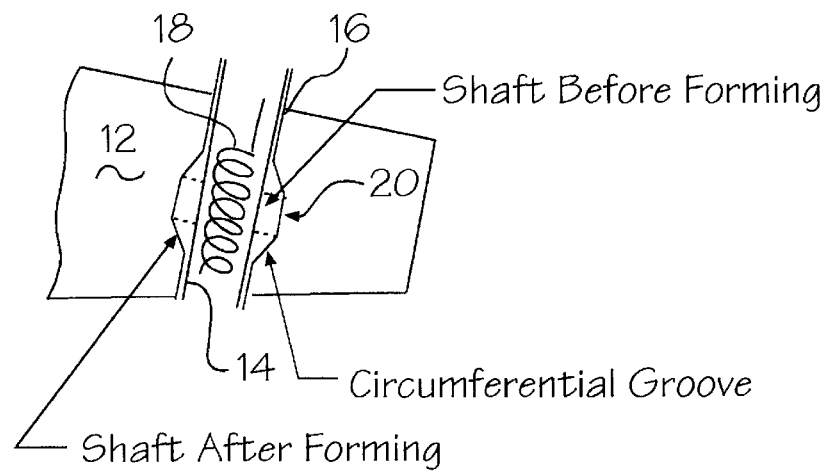
FIG. 3 illustrates a sectional view of a section taken along lines A—A of FIG. 1.
Figure 6:
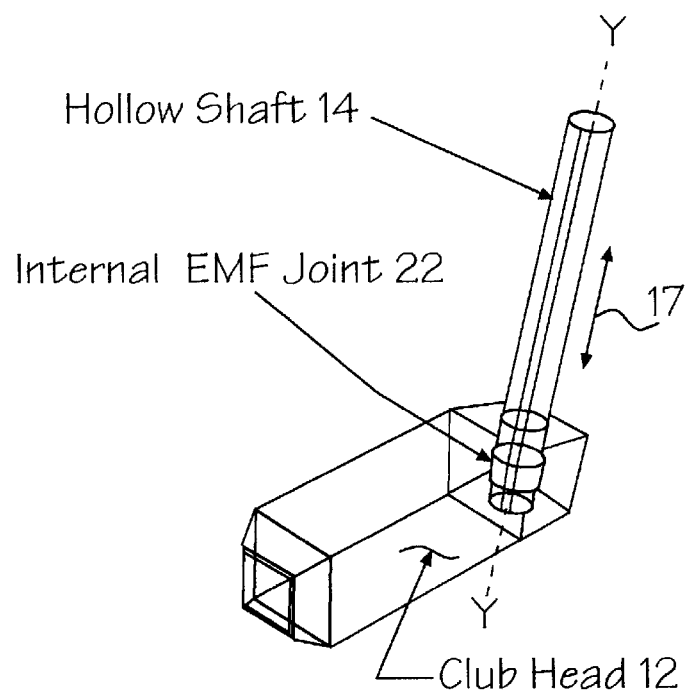
FIG. 6 depicts a perspective view of the golf club head and shaft shown in FIG. 1, in an assembled state.

As can be observed in FIG. 3, the club head 12 comprises an internal bore 16 into which the hollow, electrically-conductive shaft 14 is placed. The internal bore 16 comprises a circumferentially-contoured aperture 20. The electrical coil 18 is inserted into the hollow shaft 14 opposite the circumferentially-contoured aperture 20, as shown. The contoured or recessed aperture 20 is provided so that the shaft 14 will expand outwardly (deform) into this hollow space during electromagnetic forming. The expanded shaft 14 forms a high strength mechanically-bonded joint 22 with the club head 12, creating an integrally inseparable union therebetween in the vertical or axial shaft direction (arrow 17), as illustrated in FIGS. 2 and 6. The axial shaft direction (arrow 17) is herein defined as along the vertical axis Y—Y of the shaft 14, as shown in FIG. 6.

Figure 4:
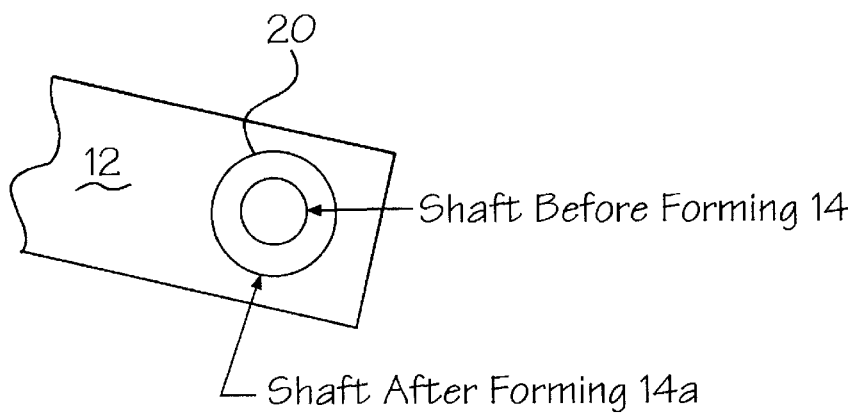
FIG. 4 illustrates a sectional view of a section taken along lines B—B of FIG. 1.

Referring to FIG. 4, a top sectional view of the shaft 14 is shown prior to expanding into the internal bore hole 20. In this view, the shaft portion 14a has expanded to fill the bore hole 20, as illustrated.

Figure 5:
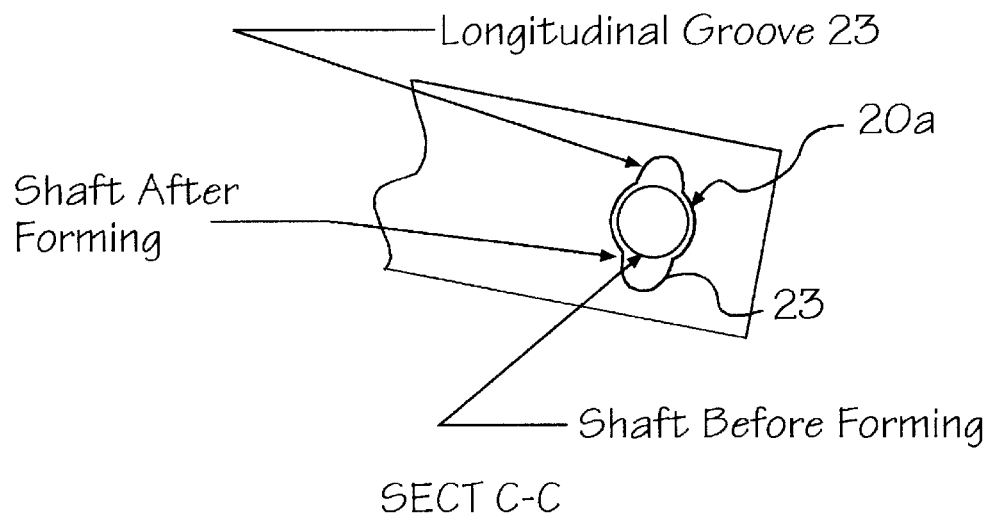
FIG. 5 illustrates a sectional view of a section taken along lines C—C of FIG. 1.

Referring to FIG. 5, there is shown a top sectional view of the bore hole 20a having longitudinal grooves 23. The shaft 14 expanding into these longitudinal grooves 23 is prevented from rotationally slipping in the bore hole 20a when the club head impacts the ball and a torque is created along the shaft by club head 12.

Figure 7:
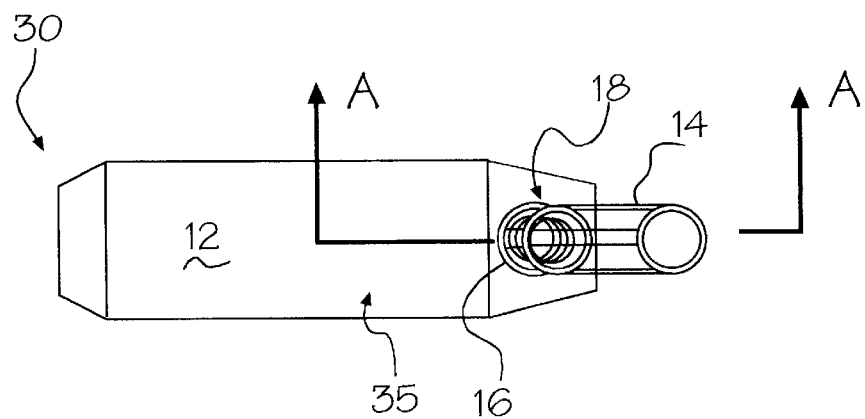
FIG. 7 depicts a top view of a golf club having a club head that receives a hollow shaft, and an internally-placed electrical coil disposed therein, in accordance with an alternate embodiment of the inventive process.
Figure 8:
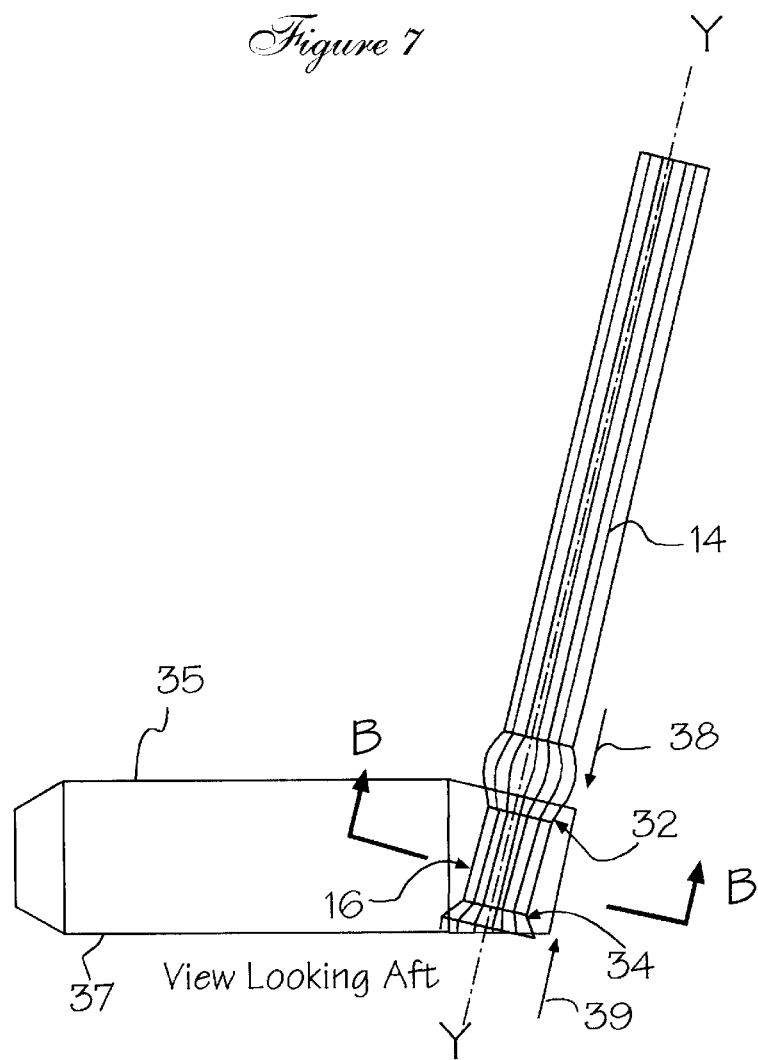
FIG. 8 shows a front view of the golf club depicted in FIG. 7, with a section thereof shown cut-away to reveal the counter-sunk holes disposed upon the upper and lower surfaces of the club head.
Figure 9:
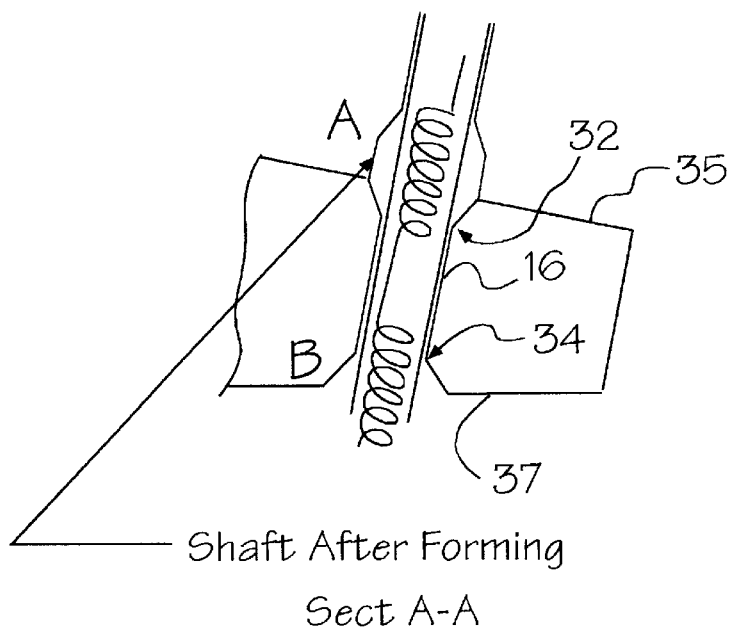
FIG. 9 illustrates a sectional view of a section taken along lines A—A of FIG. 7.
Figure 10:
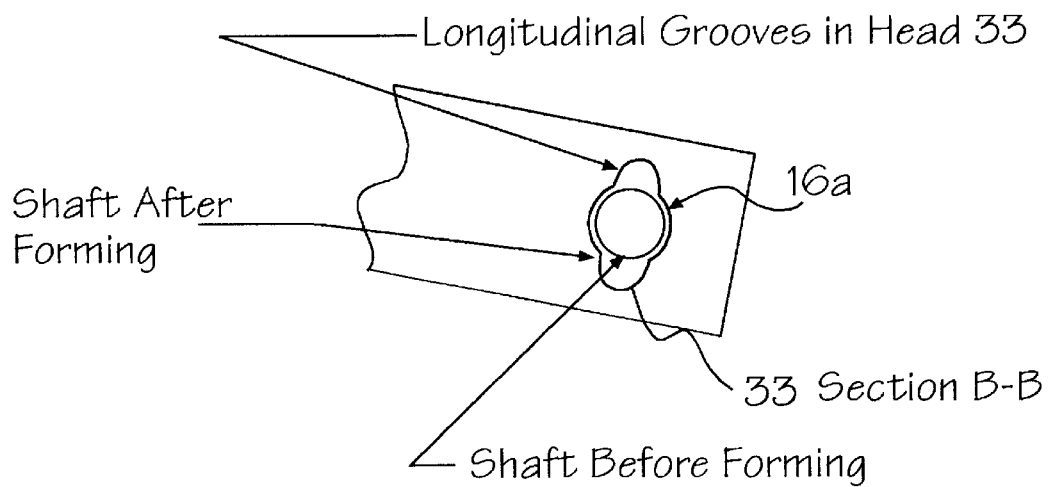
FIG. 10 illustrates a sectional view of a section taken along lines B—B of FIG. 8.

Referring to FIG. 7, a second embodiment golf club 30 is shown for the process depicted in FIGS. 1 through 6. The golf club 30 is fabricated with a hollow, electrically-conductive shaft 14, which is inserted into bore 16 of club head 12, as before. The club head 12 now comprises two counter-sunk depressions 32 and 34, disposed on the upper and lower surfaces 35 and 37, respectively, of the club head 12, as shown in FIGS. 8 and 9. In order to form a mechanical bond between the shaft 14 and the club head 12, using the electromagnetic forming process, it is necessary, as before, to insert an electric coil 18 into the hollow shaft 14 at points "A" and "B", which represent the locations of the counter-sunk depressions 32 and 34, respectively, as illustrated in FIG. 9. The electromagnetic forming process expands the shaft 14 outwardly at points "A" and "B" to form a mechanical bond, as illustrated in FIGS. 8 and 10. The shaft 14 is outwardly expanded at both of these counter-sunk surfaces, such that the shaft 14 cannot be withdrawn from the club head 12 in either an upward (arrow 39) or downward (arrow 38) axial direction, along the shaft 14.

The mechanical bond provides an inseparable union along the vertical axis Y—Y of the shaft 14.

Referring to FIG. 10, a top sectional view of the bore 16a is shown having longitudinal grooves 33. The shaft 14, expanding into these longitudinal grooves 33, is prevented from rotationally slipping in the bore 16a when the club head impacts the ball and a torque is created along the shaft 14 by club head 12. The purpose of the vertical grooves 33 is to capture the shaft 14 in these grooves and prevent angular or rotational movement about the vertical axis defined by line Y—Y.

Figure 11A:
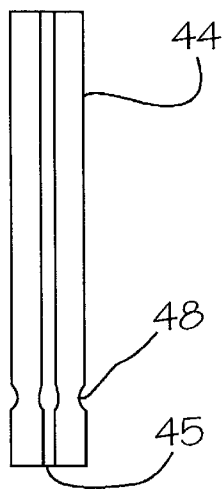
FIGS. 11a and 11b respectively depict a front and bottom view of a non-conductive shaft having circumferential and longitudinal gooves for capturing a conductive sleeve thereupon.
Figure 11B:
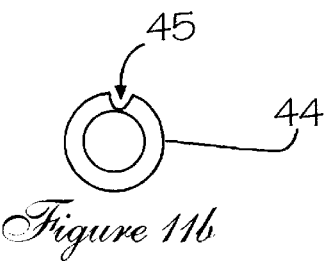

Now referring to FIGS. 11a and 11b, a non-conducting shaft 44 is shown. A typical non-conducting shaft 44 can comprise carbon fiber composite material. Such a shaft cannot be directly electromagnetically-formed to the club head 12, as described above. However, the electromagnetic forming process can be modified to provide a means by which this shaft 44 can be permanently bonded to the club head 12.

Figure 12B:
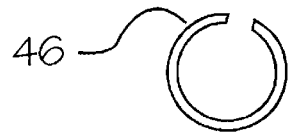
FIGS. 12a and 12b show respective front and bottom views of a conductive sleeve that is connected to the non-conductive shaft illustrated in FIGS. 11a and 11b.
Figure 12A:
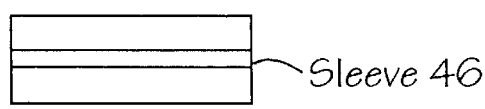
Figure 13A:
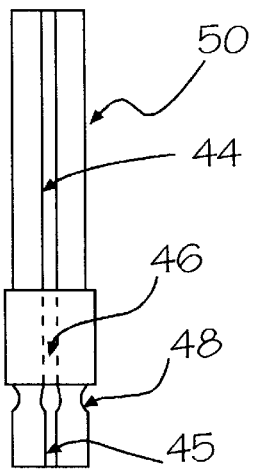
FIGS. 13a and 13b illustrate respective front and bottom views of the conductive sleeve of FIGS. 12a and 12b after it has been assembled upon the non-conductive shaft, shown in FIGS. 11a and 11b.
Figure 13B:
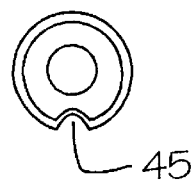

The new forming process is now conducted in two stages. First, a conductive sleeve is electromagnetically shrunk to the non-conductive shaft to form an assembly of shaft and sleeve. Secondly, this assembly is electromagnetically expanded within the club head bore, as is explained below. The new process includes conductive sleeve 46, as illustrated in FIGS. 12*a* and 12*b*. This conductive sleeve 46 is electromagnetically assembled to the non-conductive shaft 44 about circumferential groove 48 and longitudinal groove 45, as shown in FIGS. 13*a* and 13*b*. The conductive sleeve 46 is slid over the non-conductive shaft 44 opposite the respective circumferential and longitudinal grooves 48 and 45. Then, an electric coil (not shown) is placed over this assemblage and pulsed. This causes the conductive sleeve 46 to shrink and bond to the non-conductive shaft 44. The grooves 48 and 45 provide an adhering surface by which a strong bond is achieved, and prevents the conductive sleeve 46 from longitudinally and rotationally shifting about the shaft 44. For this purpose, the grooves 48 and 45 may be respectively replaced by circumferential and longitudinal protuberances (not shown).

After this first step of electromagnetic forming, the shaft and sleeve assembly 50 (FIGS. 13*a* and 13*b*) is inserted into the bore 16 of the club head 12, as previously described. The shaft and sleeve assembly 50 is electromagnetically bonded to the club head 12 in similar fashion, as previously described with respect to FIGS. 1 through 6.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A golf club, comprising a golf club head having an electrically-conductive shaft projecting therefrom in a substantially vertical direction, said conductive shaft disposed within said golf club head and having an outwardly expanded portion disposed within at least one recess within said golf club head, said electrically-conductive shaft being electromagnetically formed within said at least one recess to form a substantially inseparable bond between said golf club head and said electrically-conductive shaft.

2. The golf club in accordance with claim 1, further comprising means defining at least one groove in said at least one recess.

3. The golf club in accordance with claim 2, wherein said at least one groove in said at least one recess comprises a substantially circumferentially-disposed groove therein.

4. The golf club in accordance with claim 3, wherein said at least one groove includes a plurality of substantially vertically-disposed grooves therein.

5. The golf club in accordance with claim 2, wherein said at least one groove includes a plurality of substantially vertically-disposed grooves therein, and at least one substantially circumferentially-disposed groove disposed therein.

6. A golf club, comprising a golf club head having an electrically-conductive shaft projecting therefrom in a substantially vertical direction, said conductive shaft disposed within said golf club head and having an outwardly expanded portion disposed within a pair of recesses, each disposed about a respective upper and lower surface of said golf club head, said electrically-conductive shaft being electromagnetically formed within each recess to form a substantially inseparable bond between said golf club head and said electrically-conductive shaft at said upper and lower surface of said golf club head.

7. The golf club in accordance with claim 6, further comprising means defining at least one groove in at least one recess of said pair of recesses.

8. The golf club in accordance with claim 7, wherein said at least one groove in said at least one recess comprises a substantially circumferentially-disposed groove therein.

9. The golf club in accordance with claim 7, wherein said at least one groove in said at least one recess includes a substantially vertically-disposed groove therein.

10. The golf club in accordance with claim 7, wherein said at least one groove includes a plurality of substantially vertically-disposed grooves in one of said pair of recesses, and at least one substantially circumferentially-disposed groove in said other one of said pair of recesses.

11. A golf club, comprising a golf club head having an electrically non-conductive shaft projecting therefrom in a substantially vertical direction, said non-conductive shaft disposed within said golf club head and having a composite assemblage portion disposed within at least one recess within said golf club head, said composite assemblage portion comprising an electrically-conductive sleeve that has been electromagnetically formed upon said non-conductive shaft, said composite assemblage portion being electromagnetically formed to said golf club head to provide a substantially inseparable bond therebetween.

12. The golf club in accordance with claim 11, further comprising means defining at least one groove in said at least one recess.

13. The golf club in accordance with claim 12, wherein said at least one groove in said at least one recess comprises a substantially circumferentially-disposed groove therein.

14. The golf club in accordance with claim 12, wherein said at least one groove in said at least one recess comprises a substantially longitudinally-disposed groove therein.

* * * * *

UNITED STATES PATENT AND TRADEMARK OFFICE
CERTIFICATE OF CORRECTION

PATENT       : 5,916,039

DATED        : June 29, 1999

INVENTOR(S)  : Bennett et al.

It is certified that error appears in the above-identified patent and that said Letters Patent is hereby corrected as shown below:

Column 3, line 8, delete "FIG. 1" and substitute therefor --FIG 2--.

Column 3, line 10, delete "FIG. 1" and substitute therefor --FIG 2--.

Column 3, line 29, delete "gooves" and substitute therefor --grooves--.

Signed and Sealed this

Twenty-third Day of November, 1999

Q. TODD DICKINSON

*Attest:*

*Attesting Officer*         Acting Commissioner of Patents and Trademarks